Dec. 30, 1969  R. L. BENTON  3,486,788
DEMOUNTABLE TOP FASTENER DEVICE
Filed Oct. 23, 1967
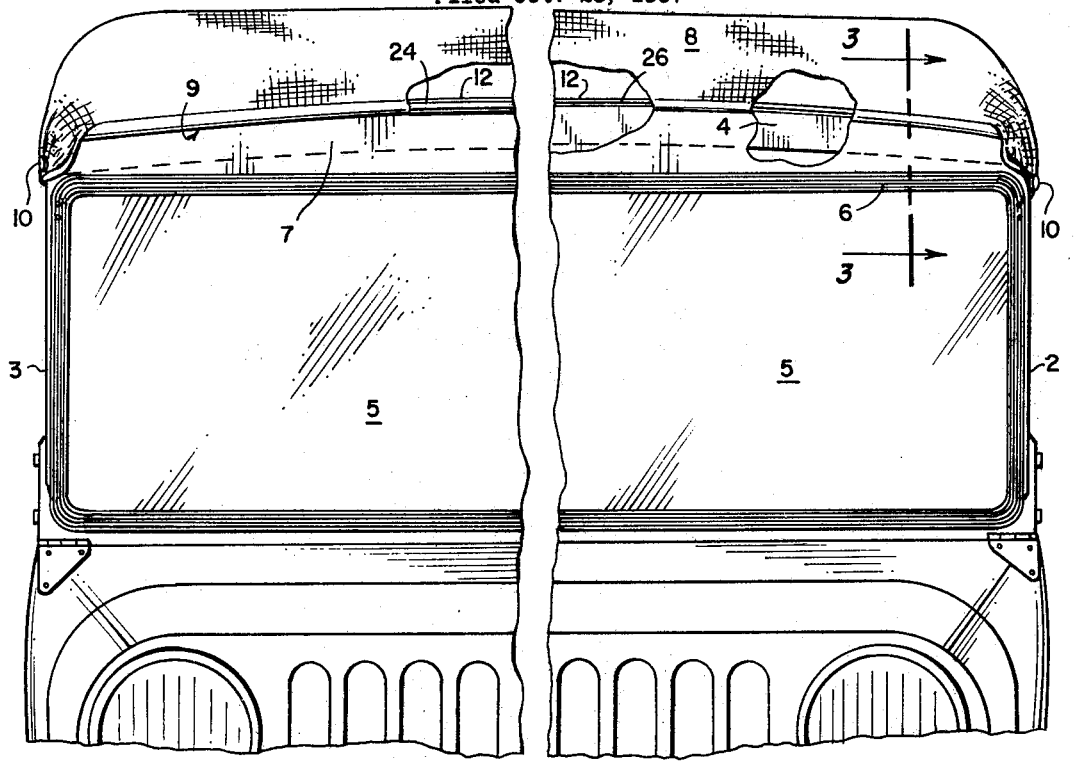
FIG. 1
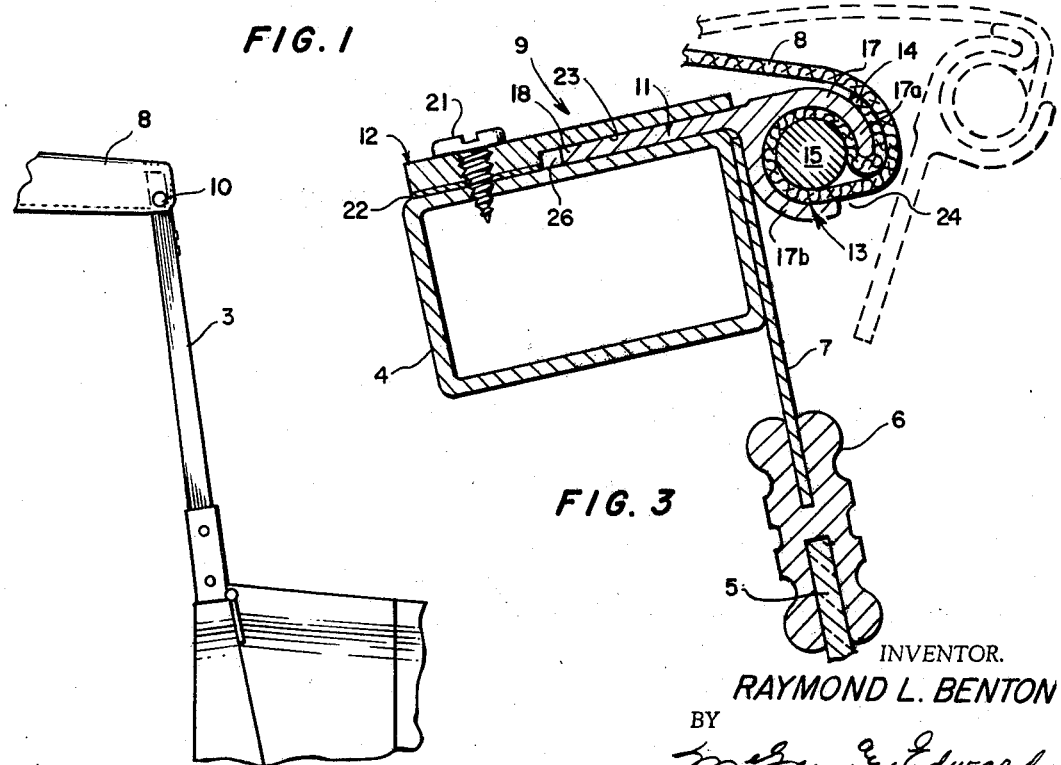
FIG. 2
FIG. 3
INVENTOR.
RAYMOND L. BENTON
BY
ATTORNEYS United States Patent Office 3,486,788
Patented Dec. 30, 1969

3,486,788
DEMOUNTABLE TOP FASTENER DEVICE
Raymond L. Benton, Denver, Colo., assignor to Kayline Manufacturing, Inc., Denver, Colo., a corporation of Colorado
Filed Oct. 23, 1967, Ser. No. 677,402
Int. Cl. B60j 7/18
U.S. Cl. 296—120                                10 Claims

ABSTRACT OF THE DISCLOSURE

Fastening device for foldable vehicle tops inclusive of movable member having an elongated slotted portion for slidably receiving and retaining beaded front end portion of foldable top and formed with a joint portion oppositely of the slotted portion. Stationary member attached to vehicle frame above windshield providing another joint portion with interfitting joint portions securing top on frame along front of windshield.

My invention relates to fastening devices which are particularly suitable for securing and releasing folding tops on motor vehicles.

Folding tops of a fabric or similar material presently used to cover jeep-type vehicles are mounted so that the forward end portion of the top is secured to a rigid frame surface above the windshield to cover the vehicle interior and released therefrom for the lowering or removal of the top to uncover the vehicle interior during fair weather driving. Ease of fastening and releasing of such fabric top is of prime importance. Further, there is the necessity of providing an effective seal between adjoining surfaces to keep out moisture, wind and the like.

Accordingly, it is an object of this invention to provide a fastening device for fabric-type vehicle tops which is simple and durable in construction and may easily be installed on various makes and models of vehicles.

Another object of this invention is to provide an improved fastening device which is efficient and easy to use in the raising, lowering and removing of a fabric top for a jeep-type vehicle.

Still a further object of this invention is to provide a fastening device for fabric-type vehicle tops which has a weather-tight seal for various types of weather conditions.

Other objects, advantages and capabilities of the present invention will be more apparent as the following description proceeds taken in conjunction with the accompanying drawings in which:

FIG. 1 is a fragmentary front elevation view showing the windshield and forward portion of a top of a jeep-type vehicle with the top being secured by a fastening device embodying features of the present invention and with portions broken away to show interior parts;

FIG. 2 is a fragmentary side elevation view of the vehicle windshield and top as shown in FIG. 1; and FIG. 3 is a sectional view taken along lines 3—3 of FIG. 1 drawn to an enlarged scale showing the approximate angle of inclination of the windshield and more detail of the fastening device in the holding position in full lines and in the detached position in broken lines.

Referring now to the drawing, in FIG. 1 the significant portions of a jeep-type motor vehicle are shown for the purposes of illustrating the various features of the present invention. The term "jeep-type vehicle" as used herein is intended to refer to various makes of vehicles having foldable tops, such as the Scout, Toyota, Land Cruiser and Jeep.

The jeep-type vehicle as shown in FIG. 1 includes an upper frame assembly inclusive of upright side posts 2 and 3 and a top frame 4 extending across the side posts in which the windshield 5 is mounted. A molding 6 is provided between the windshield and metal portions of the frame assembly. The top frame 4 particularly in later jeep models does not extend straight across but is arched upwardly and toward the center of the vehicle. Frame 4 is hollow and oblong in section. A metal plate 7 is secured at a forward surface of the top frame 4 and extends downwardly in a depending manner therefrom. The upper end of the windshield and molding are attached to the lower depending edge of the plate 7.

The forward edge or end portion of the foldable top 8 is secured to the top frame 4 by the fastening device of the present invention generally designated by 9 so that it is held along the top frame to cover the vehicle interior as shown. Snap fasteners 10 are secured to the foldable top at each forward corner and the upper ends of the side posts to hold these forward corners on the side posts.

The fastening device 9 is essentially of a two piece construction which is generally herein referred to as a movable member 11 joined to the forward end of the vehicle top and a stationary member 12 mounted on the top frame 4. The foldable top has a special configuration herein referred to as a beaded end portion 13 which is preferably formed by folding the forward edge 14 of the top material or fabric back over a rope-like cylindrical member 15 which may be of fiber, rubber or like material.

The movable member 11 includes a socket portion 17 which receives and retains the beaded end portion of the top and a joint portion 18 in the form of a flat male member or tongue portion. The socket portion 17 is generally tubular construction, open at one or both ends and of a preferred circular section as shown. It is disposed in a depending manner with respect to one end of the flat joint portion 18.

A slot 24 of sufficient dimension to pass at least a double thickness of the top material is formed along one side of the circular section throughout its lengthwise extent. More specifically, the slot is in essentially the fourth quadrant of the circular section and approximately below the center thereof as viewed from the right side of the vehicle as shown in FIG. 3. Thus, when mounted as shown in FIG. 3, the socket portion 17 may be likened to a downturned channel portion having overhanging and upturning portions 17a and 17b forming the slot 24 which engage and hold the beaded portion of the top. The beaded portion 13 will then pull against these portions with the foldable top extending back and over the overhanging portion 17a.

The stationary member 12 is secured on an upper surface of the top frame 4 as by a plurality of metal screws disposed in spaced relation therealong. A gasket 22 or similar sealing member is disposed between the stationary member and the top frame 4 for sealing out moisture and the like. The undercut portion 23 of the stationary member when positioned forms with an adjoining portion of the top frame a groove or slot 26 open forwardly of the windshield which provides a joint portion in which the tongue portion 18 is inserted. In the inserted position, the forward end of the foldable top is thus held in a tight-fitting covering relation along the top of the frame 4.

In a preferred construction, the movable and stationary members are generally thin and flat in profile and are continuous and substantially coextensive with each other and with the top frame 4 but terminate inside of posts 2 and 3. The joint portion 18 and socket portions 17 are preferably coextensive and each are of single piece construction. A metal such as aluminum is preferred for the movable member.

In the first of the three broken portions of the front view of FIG. 1 proceeding from left to right, the top portion 8 is removed to show a front view of the assembled fastening device having a continuous forward slot 24 throughout its lengthwise extent. In the second, the top 8 and movable member 11 are removed to show the continuous slot 26 formed between the stationary member 12 and the frame 4 and in the third, the plate is removed to show the frame 4 which extends across the tops of the side posts.

The above described fastening device may be installed on the vehicle by first forming spaced apertures in the top surface of the top frame 4, placing the gasket 22 and stationary member 12 in position and inserting the screws 21. The tongue portion 18 of the movable member is then slid into the slot or recess 26 formed by the stationary member and the beaded portion 13 is slipped into the one open end of the socket portion 17. The foldable top 8 is then pulled over the top of the beaded portion 13 and top frame 4 toward the rear of the vehicle.

To remove or lower the top to uncover the vehicle interior, the tongue portion is moved forwardly out of the slot as is shown in dash lines in FIG. 3. To replace for covering the vehicle interior, the tongue portion 18 is slid back into the slot 26. Thus, it is apparent that with the essentially rigid single piece construction of an aluminum strip, the movable member joined along the forward end portion of the top may be easily lowered and raised by a single person from one side of the vehicle.

I claim:

1. A fastening assembly for mounting on a vehicle windshield for use in holding convertible fabric tops thereon comprising a fastening member having a flat rear portion for insertion between flat surfaces of a windshield frame assembly and a forwardly extending socket portion beyond the windshield for receiving a cylindrical top fabric portion enclosing a rope-like member which bridges the forward end of the fabric top and is secured thereon, and clamping means acting on the frame assembly for establishing an enclosed space between flat surfaces of the assembly into which the flat rear portion is inserted after the rope-like member is secured thereby preventing wind flow between the forward end of the fabric top and said windshield.

2. A fastening assembly as defined in claim 1, in which the fastening assembly extends the full width of the fabric top at its forward end.

3. A fastening assembly as defined in claim 1, in which the socket portion is generally cylindrical in section and has a slotted forward portion through which an end portion of the top extends.

4. A fastening assembly as defined in claim 1, in which the flat surfaces of the windshield frame assembly are spaced sufficiently by the clamping means to admit the rear portion of the fastening member before it is secured in fitted relation between said flat surfaces.

5. A fastening assembly as defined in claim 1, in which the fastening member has an undercut portion at its forward end forming an entrance to its socket portion.

6. The combination of a vehicle windshield for use with convertible fabric tops comprising a separable fastening member having a flat rear portion secured between flat surfaces of a windshield frame assembly for securing a fabric top and a forwardly extending socket portion beyond the windshield for confining a cylindrical top fabric portion enclosing a rope-like member which bridges the forward end of the fabric top and is secured thereby, and clamping means for maintaining substantially uniform spacing between the engaging flat surfaces in which the flat rear portion is fitted thereby preventing wind flow between the forward end of the secured fabric top and said windshield.

7. The combination as set forth in claim 6, wherein the separable fastening member, the forward end of the fabric top and the windshield are of substantially uniform width.

8. The combination as set forth in claim 6, which is assembled by first confining the rope-like member in the socket portion when the fastening member is separated from the windshield frame, and the flat rear portion is then inserted between the flat frame surfaces and secured by friction fit with the flat frame surfaces.

9. The combination as defined in claim 6, in which the socket portion is disposed in a generally depending position with its lower forward portion slotted to provide an entrance to its interior.

10. The combination as defined in claim 6, in which the fastening means may be adjustably moved between the flat frame surfaces to tauten the top fabric in its secured position.

References Cited

UNITED STATES PATENTS

| | | | |
|---|---|---|---|
| 2,943,760 | 7/1960 | Hamilton | 296—100 |
| 3,093,845 | 6/1963 | Brock et al. | 9—1 |
| 3,122,394 | 2/1964 | Brydon | 135—6 |
| 3,151,908 | 10/1964 | Horst | 296—100 |
| 3,172,419 | 3/1965 | Lewis | 9—1 |
| 3,201,171 | 8/1965 | Wickard | 296—100 |

LEO FRIAGLIA, Primary Examiner

JOEL E. SIEGEL, Assistant Examiner

U.S. Cl. X.R.

9—1; 135—6